United States Patent
Karwath et al.

(10) Patent No.: US 8,054,020 B2
(45) Date of Patent: Nov. 8, 2011

(54) ELECTRIC MOTOR

(75) Inventors: Arno Karwath, Deisslingen (DE); Elvis Nocita, Schramberg (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 362 days.

(21) Appl. No.: 12/484,281

(22) Filed: Jun. 15, 2009

(65) Prior Publication Data

US 2009/0315491 A1    Dec. 24, 2009

(30) Foreign Application Priority Data

Jun. 19, 2008    (DE) ..................... 20 2008 008 563 U

(51) Int. Cl.
*H02P 6/00* (2006.01)
*H02P 6/16* (2006.01)

(52) U.S. Cl. .................. 318/400.26; 318/254; 318/439; 318/400.01; 318/400.07

(58) Field of Classification Search ............ 318/400.01, 318/400.07, 400.13, 400.26, 254, 439, 379; 388/801

See application file for complete search history.

(56) References Cited

U.S. PATENT DOCUMENTS

| | | | | |
|---|---|---|---|---|
| 4,376,261 A | * | 3/1983 | von der Heide et al. . | 318/400.04 |
| 4,379,984 A | * | 4/1983 | Muller .................... | 318/400.29 |
| 4,535,275 A | * | 8/1985 | Muller .................... | 318/400.29 |
| 4,583,028 A | | 4/1986 | Angersbach et al. .... | 318/400.21 |
| 4,626,751 A | * | 12/1986 | Doemen .................. | 318/400.08 |
| 4,761,599 A | | 8/1988 | Yasunobu et al. ........ | 318/723 |
| 5,600,216 A | | 2/1997 | Karwath et al. .......... | 218/291 |
| 6,239,566 B1 | | 5/2001 | Tareilus et al. ........... | 318/379 |
| 7,015,668 B2 | * | 3/2006 | Berroth .................... | 318/400.26 |
| 7,053,573 B2 | | 5/2006 | Okumura et al. ......... | 318/452 |
| 7,446,492 B2 | | 11/2008 | Wei et al. ................. | 318/275 |
| 7,759,884 B2 | * | 7/2010 | Dufner et al. ............ | 318/400.01 |
| 7,902,776 B2 | * | 3/2011 | Karwath .................. | 318/400.07 |
| 2005/0083002 A1 | * | 4/2005 | Berroth .................... | 318/439 |

(Continued)

FOREIGN PATENT DOCUMENTS

DE    31 45 232 A    6/1983

(Continued)

OTHER PUBLICATIONS

Pat. Abs. of Japan, Fan System & Method of Braking, JP 2007-159391-A, Wei et al, 1 page.

*Primary Examiner* — Paul Ip
(74) *Attorney, Agent, or Firm* — Milton Oliver, Esq.; Oliver Intellectual Property LLC

(57) ABSTRACT

An electric motor has a DC link circuit (30, 32), a permanent-magnet rotor (104), and a control circuit having a full bridge (114). A program-controlled calculation arrangement (80) is configured to supply the semiconductor switches of a first bridge half with a PWM signal (136, 136') and to supply the semiconductor switches (118, 122) of the second bridge half with a commutation signal (O1, O2; 150, 150'). An energy storage device (170) is provided which, during normal operation of the motor (102), is chargeable from the DC link circuit (30, 32) and serves, upon cessation of the signals from the calculation arrangement (80), to make the semiconductor switches (118, 122) of the other bridge half conductive, and thereby to short-circuit the stator winding arrangement (106) through those semiconductor switches (118, 122) in order to decelerate the permanent-magnet rotor (104) and to thereby minimize risk of human injury.

9 Claims, 5 Drawing Sheets

U.S. PATENT DOCUMENTS

2007/0189739 A1* 8/2007 Dufner et al. ................. 388/801
2007/0241705 A1* 10/2007 Karwath ....................... 318/439

FOREIGN PATENT DOCUMENTS

| | | |
|---|---|---|
| DE | 36 90 376 C2 | 1/1987 |
| DE | 42 23 208 A | 1/1994 |
| DE | 198 35 576 | 11/1999 |
| DE | 10 2005 035 055 A | 2/2007 |
| EP | 0 081 684 | 6/1983 |
| EP | 1 845 609 A | 10/2007 |
| GB | 2 193 397 A | 1/1987 |
| JP | 11-041 969 A | 2/1999 |
| JP | 2002-005 973 A | 1/2002 |

* cited by examiner

ELECTRIC MOTOR

CROSS-REFERENCE TO RELATED APPLICATION(S)

This application claims priority from our German application DE 20 2008 008 563.2, filed 19 Jun. 2008, the entire content of which is hereby incorporated by reference.

FIELD OF THE INVENTION

The present invention relates to an electronically commutated motor (ECM), as used principally to drive fans.

BACKGROUND

Such fans are used, among other purposes, to cool electrical cabinets. When such an electrical cabinet is opened, the fans are automatically switched off, but they continue to rotate for a while, and the risk therefore exists, that someone may bring his or her hand into contact with the sharp rotating blades on the rotor of such a fan. It is therefore important that, as soon as such a fan becomes currentless (for whatever reason), it is automatically decelerated very quickly, in order to minimize the risk of human injury.

SUMMARY OF THE INVENTION

It is therefore an object of the invention to make available a novel electric motor whose rotor is automatically decelerated under predetermined conditions.

According to the present invention, this object is achieved by an electric motor in which its program-controlled calculation device, in the event of a power outage, promptly ceases to supply signals to the semiconductor switches, and a charge stored on an internal energy storage device is used to short-circuit the stator windings and promptly decelerate the motor rotor and any fan blades attached thereto. When such a motor is switched off, the energy that serves to supply the calculation device is used up practically instantaneously, so that the calculation device can no longer supply signals to the Metal Oxide Semiconductor Field Effect Transistors (MOSFETs) controlling the stator winding currents, with the result that a short-circuit braking function is automatically activated.

The following is highly advantageous in this context: when such a motor, in a shut-off state, is driven by air flows that cause the rotor of a fan to rotate, the motor acts as a generator and generates a voltage at the link circuit, which voltage charges the storage device provided there. Because the program-controlled calculation device continues to be deactivated under these conditions, the short-circuit braking function is automatically switched on in this case as well, so that, for example, a fan being driven by such a motor cannot reach high rotation speeds. This is advantageous, in particular, when such a fan is driven in the "wrong" rotation direction by the air flow. In an experiment, for example, a fan was driven by such an air flow at 3500 rpm in the wrong direction when the short-circuit braking function was not activated; and with the short-circuit braking function activated, that rotation speed was reduced to 500 rpm, with no use of external electrical energy.

In such a case, this facilitates startup in the correct direction, since the motor needs first to be decelerated only from 500 (rather than 3500!) rpm to zero rpm, and then accelerated to, for example, the rated rotation speed of 6000 rpm.

What is obtained is therefore a fan that electrically brakes itself without an external supply of electrical energy, or that prevents uncontrollable air flow from producing high rotation speeds that might, for example, injure a maintenance engineer.

BRIEF FIGURE DESCRIPTION

Further details and advantageous refinements of the invention are evident from the exemplifying embodiment, in no way to be understood as a limitation of the invention, that is described below and depicted in the drawings.

DETAILED DESCRIPTION

Figure 1:
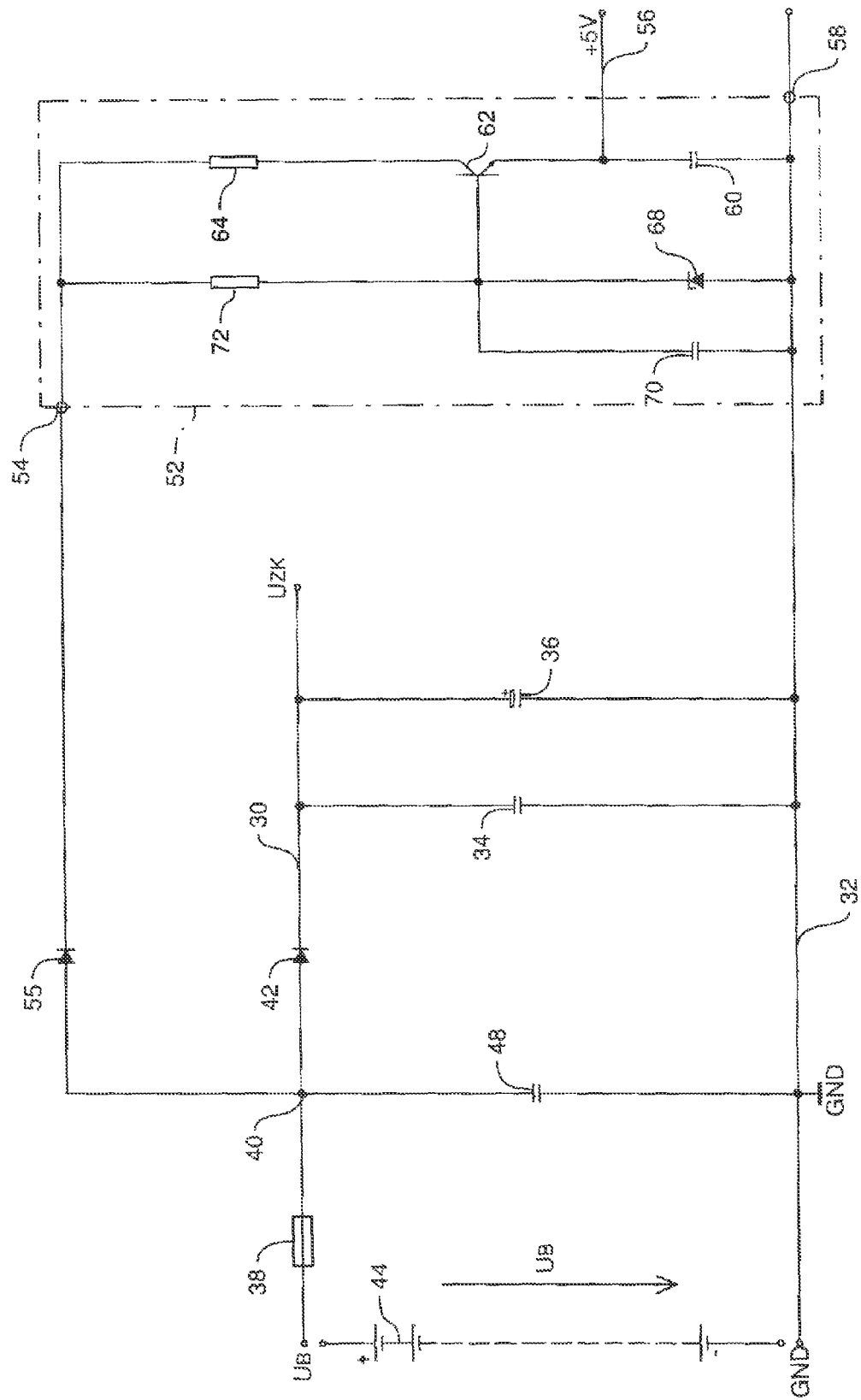
FIG. 1 is a circuit diagram showing the connection of an electric motor to an electrical energy source.

FIG. 1 shows positive branch 30 of a DC link circuit, a voltage $U_{ZK}$ being present between said branch and ground 32, during operation. In the case of a fan, this voltage is often in a range between 8 and 100 VDC, but can also be higher or lower.

Some motors can be operated in a relatively wide voltage range, e.g. between 20 V and 80 VDC. Located between positive branch 30 and ground 32 is a capacitor 34 for filtering out high-frequency interference, and a so-called "link circuit" capacitor 36 having a higher capacitance, usually an electrolytic capacitor.

Lead 30 can be connected via a fuse 38, a node 40, and a diode 42 to an external operating voltage $U_B$, depicted here symbolically as battery 44, e.g. as the local battery of a telephone switching center. Located between node 40 and ground 32 is a capacitor 48 that serves to filter out interference.

FIG. 1 also shows a circuit 52 whose positive input 54 is connected via a diode 55 to node 40, and that generates a regulated DC voltage between its outputs 56 (+) and 58 (ground). Located between outputs 56, 58 is a capacitor 60 that is connected, in series with an npn control transistor 62 and a resistor 64, to input 54. The base of transistor 62 is connected to ground 32 via the parallel circuit of a Zener diode 68 and a capacitor 70, and said base is connected via a resistor 72 to input 54.

Regardless of the instantaneous voltage at node 40, power supply 52 generates a regulated DC voltage of 5 V between its outputs 56, 58. Its manner of operation is known and will therefore not be described. Diodes 42, 55 prevent damage to the motor due to incorrect connection, and are referred to as "incorrect polarity" diodes or "mispolarity" diodes.

Figure 2:
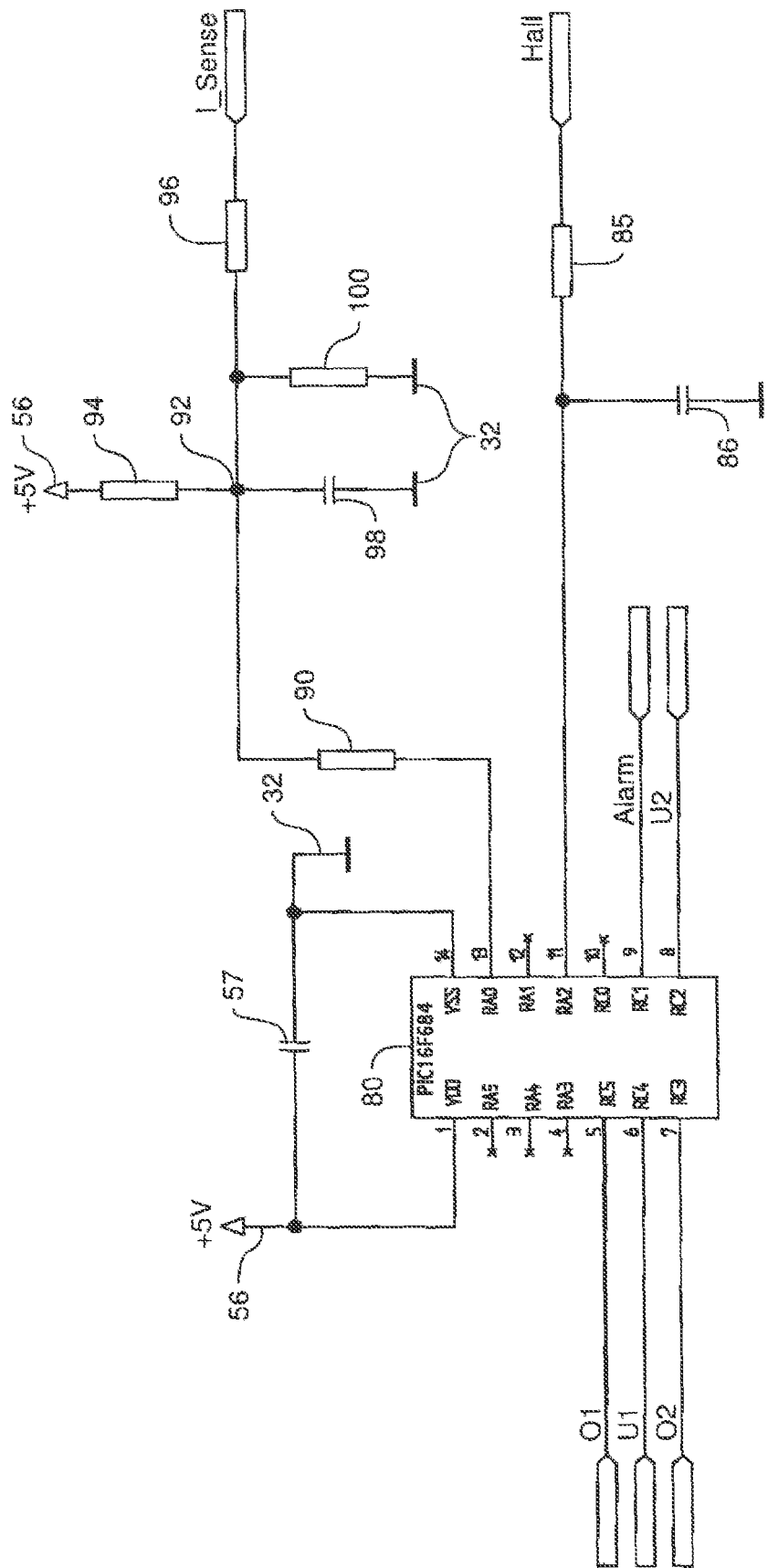
FIG. 2 shows the basic circuit of a program-controlled calculation device, in this case a PIC16F684 microcontroller (µC) from Microchip Technology Inc. of Chandler, Ariz., USA.

FIG. 2 shows the circuit of a suitable program-controlled calculation device, in this case of a PIC16F684 µC 80 from Microchip Technology Inc. of Chandler, Ariz., USA.

This microcontroller receives at its input 1, from output 56 (FIG. 1), the regulated operating voltage of +5 V. Its input 14 ($V_{SS}$) is connected to ground 32. A capacitor 57 is located between input 1 and ground 32.

The μC 32 depicted has fourteen terminals, as follows:
1 $V_{CC}$ (regulated voltage +5 V)
2 RA5 (not connected)
3 RA4 (not connected)
4 RA3 (not connected)
5 RC5—A signal O1 is generated here
6 RC4—A signal U1 is generated here
7 RC3—A signal O2 is generated here
8 RC2—A signal U2 is generated here
9 RC1—An "Alarm" signal can be generated here when specific conditions exist.
10 RC0 (not connected)
11 RA2—A rotation position signal "Hall" is delivered to this input from a Hall sensor 84 (FIGS. 3 and 5) via a resistor 85, which signal serves to control commutation of the motor. A capacitor 86 serves to filter this signal.
12 RA1 (not connected)
13 DATA—Analog signals that are to be digitized can be delivered to this input, e.g. as depicted, a signal I_Sense that is an indication of the magnitude of the motor current i_mot in a measuring resistor 88 (FIGS. 3 to 5) and serves to limit i_mot to a desired value.
14 $V_{SS}$—Ground terminal.

Terminal 13 is connected via a resistor 90 to a node 92. The latter is connected via a resistor 94 to terminal 56 (+5 V), also via a resistor 96 to upper terminal 89 of measuring resistor 88, and via a capacitor 98 and a resistor 100 to ground 32.

Elements 90, 94, 96, 100 serve to shift the signal I_Sense into a predetermined voltage range that can be digitized by the A/D converter of μC 80 in order to enable current limiting for all currents i_mot.

Figure 3:
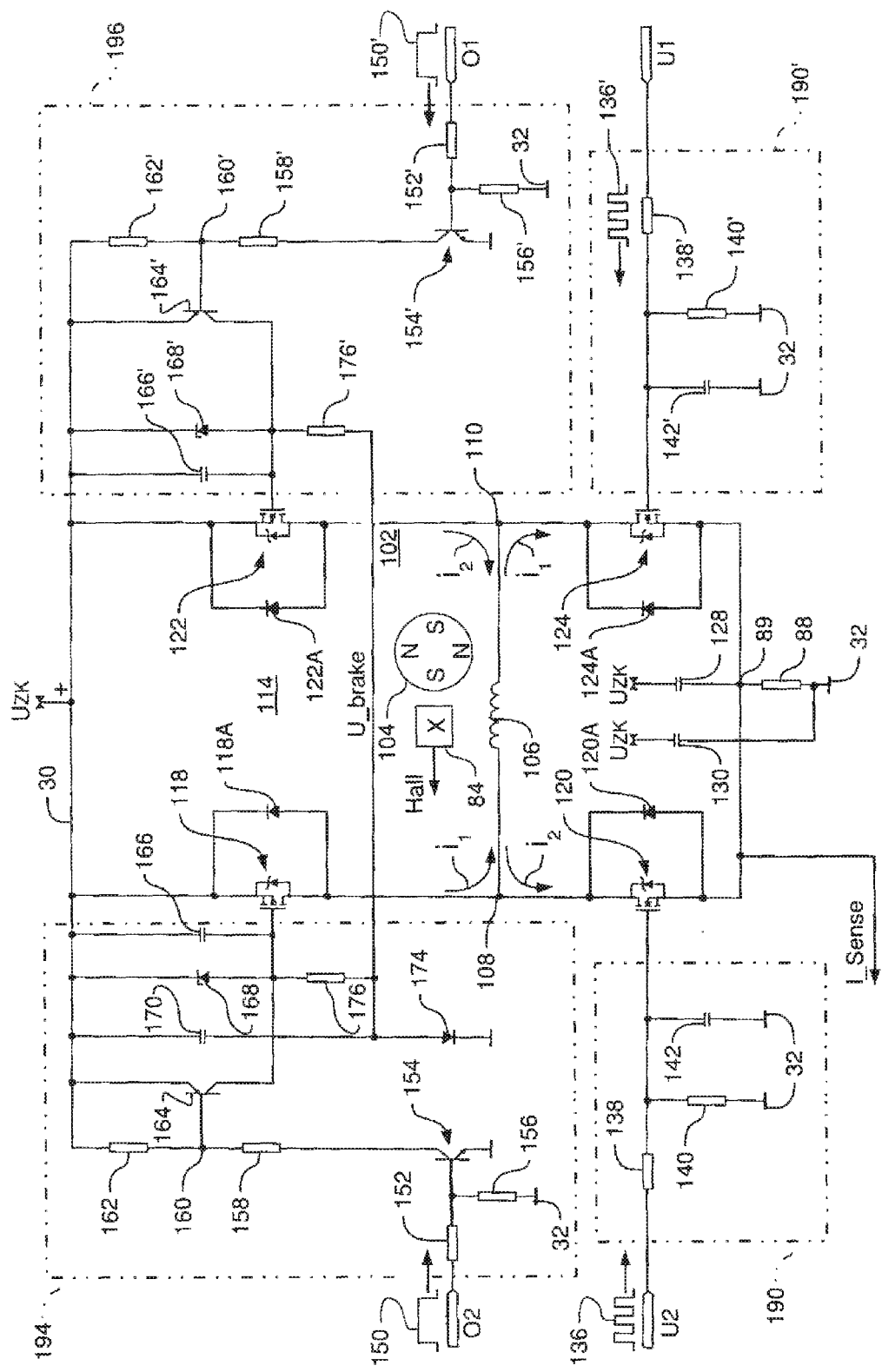
FIG. 3 shows the configuration of an electronically commutated electric motor (ECM) having automatic braking in the event of a power outage, and having an H bridge.

FIG. 3 is an overview circuit diagram of a preferred embodiment of ECM motor 102. The latter has a permanent-magnet rotor 104 which is depicted here only very schematically and with four rotor poles, but of course can also have other numbers of poles. Rotor magnet 104 controls Hall sensor 84, which likewise is depicted only very schematically.

In this example, motor 102 has only a single winding strand 106 that is arranged between two nodes 108, 110. During operation, an alternating current i1 flows from node 108 to node 110, and a current i2 then flows from node 110 to node 108.

A so-called H bridge 114, along whose diagonal (as depicted) winding strand 106 is arranged, serves to control currents i1, i2. Bridge 114 is in this instance a full bridge, and node 108 is connected via a p-channel MOSFET 118 to link circuit 30, and via an n-channel MOSFET 120 to node 89. Node 110 is similarly connected via a p-channel MOSFET 122 to link circuit 30, and via an n-channel MOSFET 124 to node 89.

A respective recovery diode 118A, 120A, 122A, 124A is located parallel to each of the respective MOSFETs 118, 120, 122, 124.

A filter capacitor 128 (e.g. 3.3 nF) is located between node 89 and link circuit lead 30, and a filter capacitor 130 (e.g. 100 nF) is located between ground 32 and lead 30.

As is evident from FIG. 3, motor 102 depicted therein, along with its electronics, is implemented in very largely symmetrical fashion. A description will therefore be given below only of its left half, which is depicted at enlarged scale in FIG. 4.

Figure 4:
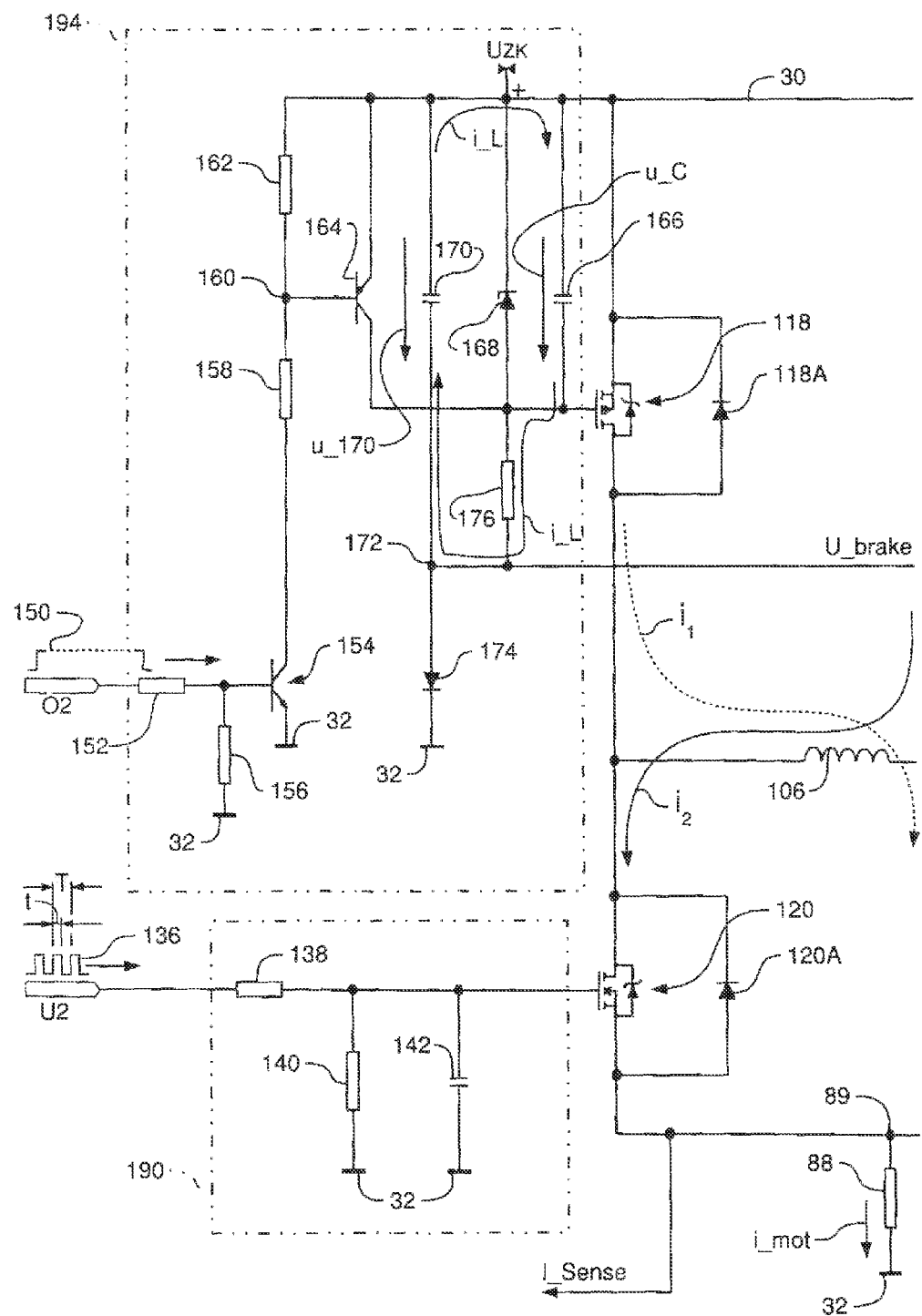
FIG. 4 is an enlarged depiction of a detail of FIG. 3.

With regard to FIGS. 3 and 4, be it noted that in normal operation, in FIG. 3 either p-channel MOSFET 118 and n-channel MOSFET 124 are switched on together, or else MOSFET 122 and MOSFET 120. In each case the lower MOSFET, i.e. either 120 or 124, is switched on and off by a PWM signal 136 (FIG. 4), usually in order to regulate the rotation speed of motor 102 to a predetermined value. Also possible alternatively, for example, is regulation of the current in motor 102 to a predetermined value in order to obtain a constant torque.

The lower Field Effect Transistors (FETS) are preferably selected so that they can be controlled directly by μC 80, e.g. are of the IRLR3410 type. These are therefore also referred to as "logic level" FETs. They can be controlled quickly and at low impedance, which is important since the frequency of the PWM signals is usually above 16 kHz. Upper FETs 118, 122, on the other hand, can switch slowly, which enables almost energyless braking.

Pulse Width Modulation (PWM) signal 136 has a (preferably constant) frequency in a range that is no longer audible to older people (who tend to develop high-frequency hearing loss), usually in the range of 16 kHz to 25 kHz. The rotation speed is controlled by modifying the pulse duty factor pwm, the applicable equation in FIG. 4 being:

$$\text{pwm}=t/T*100\% \quad (1),$$

i.e. when current i1 or i2 is flowing continuously, pwm=100%, and when it is not flowing at all, pwm=0%.

Signal 136, which is labeled U2 in FIGS. 2 and 4, is generated by μC 80, which contains a PWM generator. Signal 136 is delivered through a resistor 138 to gate G of MOSFET 120. A resistor 140 and a small capacitor 142, e.g. 1 nF, are located between said gate G and ground 32.

When signal 136 (U2) has a value of 0 V, MOSFET 120 is blocked; and when signal 136 is positive, MOSFET 120 conducts.

The current i_mot is influenced by the pulse duty factor pwm, i.e. when pwm=0%, i_mot=0, and when pwr=100%, i_mot=max.

The measured value I_Sense prevents i_mot from exceeding a predetermined upper limit value, i.e. in this case the MOSFET 120 or 124 that is presently conductive is briefly blocked. MOSFETs 120 and 124 also immediately block when power supply 52 (FIG. 1) is no longer generating output voltage.

Source S of upper MOSFET 118 in FIG. 4 is at the potential of lead 30, which equals, for example, +48 V or +80 V; and the application of control to MOSFET 118 and to MOSFET 122 therefore requires a potential of the same order of magnitude.

MOSFET 118 is controlled by a commutation signal 150 that is furnished by output O2 of μC 80 and is delivered through a resistor 152 to the base of an npn transistor 154. The base of transistor 154 is connected via a resistor 156 to ground, as is its emitter.

The collector of transistor 154 is connected via a resistor 158, a node 160, and a resistor 162 to lead 30.

Node 160 is connected to the base of a pnp transistor 164 whose emitter is connected to lead 30, and whose collector is connected to gate G of MOSFET 118. A capacitor 166 is located between gate G and source S of MOSFET 118. The voltage at capacitor 166 is limited by a Zener diode 168 to, for example, 13 V. Zener diode 168 is connected in parallel with capacitor 166. If the voltage u_C at capacitor 166 is less than the Zener voltage of diode 168, the latter has a very high impedance and discharges capacitor 166 only with currents on the order of microamperes, i.e. it then has no further influence on the charge state of capacitor 166 (or 166').

A capacitor 170, which in the present case is allocated jointly to both upper MOSFETs 118, 122, is provided for energy storage. This capacitor is connected, in series with a node 172 and a diode 174, between leads 30 and 32, so that, during operation, it is charged to a voltage u_170 that corresponds approximately to voltage $U_{ZK}$.

At the same time, as long as transistor 164 is not conductive, a charging current i_L flows from capacitor 170 through resistor 176 to capacitor 166, and maintains the latter's charging voltage u_C at the value of the Zener voltage of Zener diode 168, i.e. for example to 13 V, so that, in this case, MOSFET 118 is made conductive by u_C.

Because μC 80 is deactivated upon cessation of a voltage at output 56, 58 of power supply 52, and therefore can no longer generate signals at its outputs; in this case, signals 136 and 150 (FIG. 4) have a value of zero.

This causes npn transistor 154 (FIG. 4) to block, with the result that transistor 164 also blocks because it is no longer receiving a base current, so that transistor 164 can no longer short-circuit capacitor 166 and the voltage u_C consequently rises, since charging current i_L flows from capacitor 170 (having the higher charging voltage u_170) to capacitor 166 and charges it to a voltage u_C that corresponds to the Zener voltage of Zener diode 168 and is equal to, for example, approximately 13 V.

As a result, when line voltage UB (FIG. 1) has ceased, upper MOSFET 118 is automatically held in the conductive state, as is MOSFET 122 (FIG. 3) on the right side of full bridge 114, so that winding strand 106 is short-circuited by the two upper MOSFETs 118, 122, and rotor 104 quickly decelerates.

This state persists as long as the energy stored in capacitor 170 is sufficient to keep the voltage u_C at capacitor 166 sufficiently high, by means of charging current i_L, to keep MOSFET 118 (as well as MOSFET 122 on the right side of full bridge 114) conductive, rotor 104 being quickly (e.g. within two seconds) decelerated to a low rotation speed by short-circuit braking. As long as capacitor 166 is sufficiently charged, the potential of gate G is therefore approximately 13 V lower than the potential $U_{ZK}$ at lead 30, as long as transistor 164 is nonconductive as a result of the power outage.

When transistor 154 is made conductive by a commutation signal 150 during normal operation, the potential of node 160 then becomes lower, with the result that transistor 164 becomes conductive and short-circuits capacitor 166 so that MOSFET 118 blocks. In this case, the current i_L flows through transistor 164. MOSFETs 118, 122 are therefore blocked when the associated signal 150 or 150' is positive, and they conduct when that signal has a value of 0 V.

This also means that, when μC 80 is deactivated because it is no longer receiving operating voltage from power supply 52, capacitor 166 becomes charged through resistor 176 by charging current i_L from capacitor 170, which thereby makes MOSFET 118 conductive.

The same happens with MOSFET 122 (FIG. 3); in this case capacitor 166' charges, so that MOSFET 122 also becomes conductive when power supply 52 is no longer furnishing operating voltage at its outputs 56, 58 to μC 80.

In this case, winding strand 106 is therefore short-circuited by both MOSFETs 118, 122, so that rotor 104 is quickly decelerated by this short-circuit braking to a low rotation speed, e.g. within two seconds for an ordinary equipment fan.

This braking also occurs automatically when, in the case of a fan, rotor 104 is driven by the wind like a windmill and runs backwards, for example at a rotation speed of 3500 rpm. In this case rotor 104 induces, in winding 106, a voltage that correspondingly charges capacitor 170 via diodes 118A, 120A, 122A, 124A; this produces at node 172 the voltage U_brake, which is sufficient to make both MOSFETs 118, 122 conductive and thereby to brake rotor 104 continuously from, for example, 3500 to 500 rpm, which makes startup substantially easier.

In this case, diode 42 prevents a current from flowing from link circuit 30 to power supply 52 and powering μC 80, i.e. the voltage $U_{ZK}$ at link circuit 30 charges capacitor 170 and thereby increases the voltage u_170, so that the voltage u_C can become sufficiently high to make the two upper MOSFETs 118, 122 conductive and to decelerate motor 102, against the force of the wind, to a low rotation speed. This represents an important safety feature which minimizes risks of injury.

Figure 5:
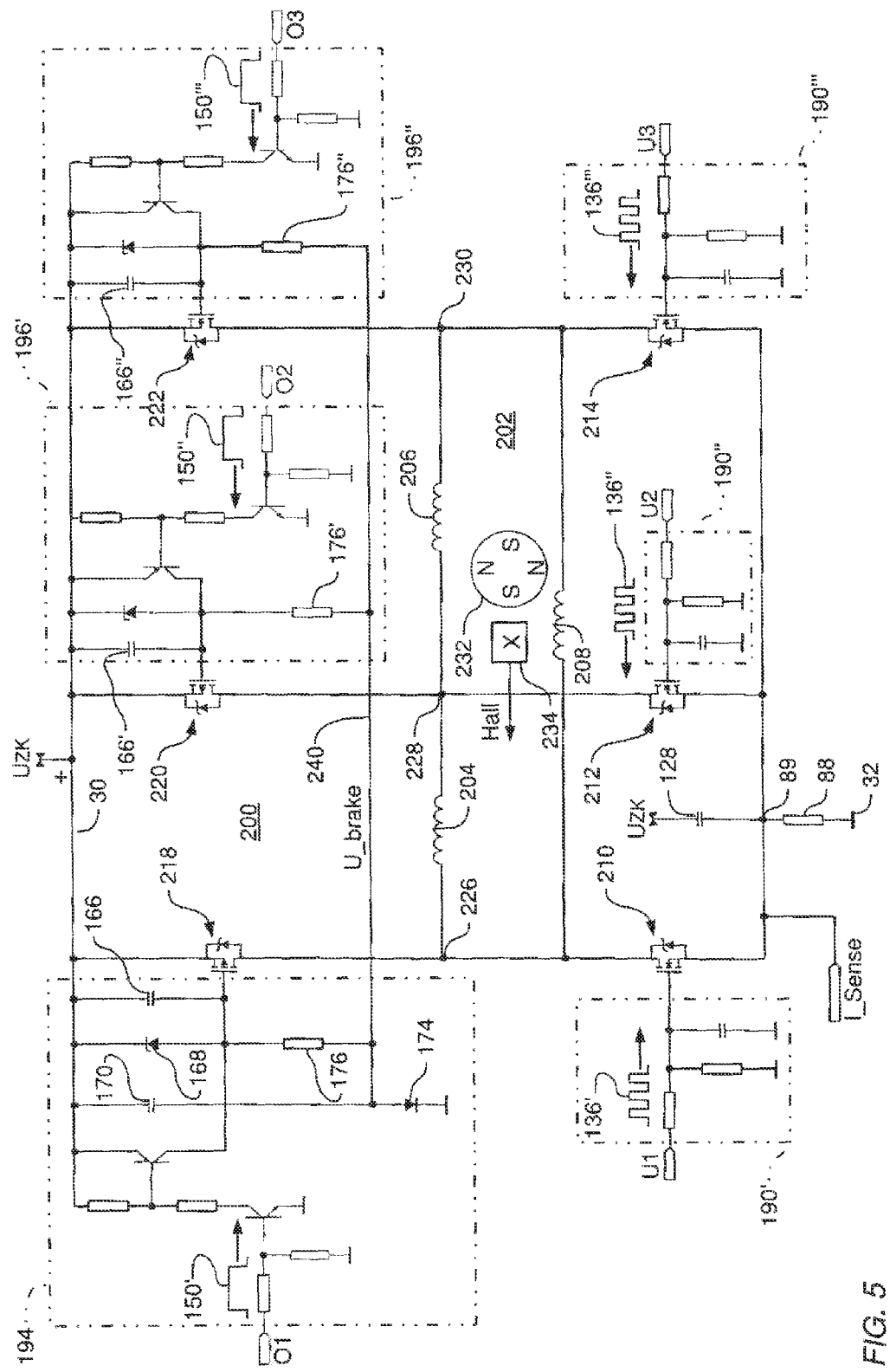
FIG. 5 shows the implementation of an electronically commutated electric motor (ECM) having automatic braking in the event of a power outage, and having a three-phase full bridge.

The same principle can of course also be used analogously with other full bridge circuits, for example in full bridge circuits for a three-phase motor, since the same problems occur there. This is shown in FIG. 5.

Other semiconductor switches having a similar action can also be used instead of MOSFETs. Such variants and modifications are also certainly possible within the scope of the present invention.

Examples of values of certain components for a 48 V fan motor (k=kilohm)

FIG. 1
C70 10 nF
C60, 57 33 nF
C34 100 nF
C36 39 μF, 100V
FIG. 2
μC 80 PIC16F684
FIGS. 3, 4
T118, 122 IRFR5410 (p-channel)
T120, 124 IRLR3410 (n-channel)
R152, 152', 162, 162', 156, 156' 10 k
R158, 15B' 62 k
T154, 154' BC846B
T164, 164' BC857B
C166, 166' 1 nF
C170 100 nF
D174 BAS316
R176, 176' 10 k
Zener diode 168, 168' BZT52C13 (13 V)

The values above were used in an experimental motor. FETs 120, 124 are designed for direct control by a μC that can supply only a low control voltage, e.g. 3.3 V or 5 V. Such FETs have a low switch-on threshold, e.g. 1 to 2 volts.

As FIG. 3 shows, the circuit for controlling H bridge 114 uses a total of four modules.

Control of the lower FETs 120, 124 is provided on the left by a module 190 through which PWM pulses 136 are delivered to FET 120, and on the right by a module 190' through which PWM pulses 136' are delivered to FET 124. Modules 190 and 190' are identical.

A module 194, which also contains capacitor 170 for energy supply, serves to control the upper left FETs 119. This module 194 was described in detail with reference to FIG. 4.

Control of the upper right FETs 122 is provided by a module 196 that is largely identical to module 194 but in which capacitor 170 and diode 174 are not provided. These two components are used jointly by the upper modules 194, 196, but could also be provided separately for each of the modules 194, 196.

With the modules just described it is also possible to configure a three-phase full bridge circuit 200, which is depicted in FIG. 5. Parts identical or functionally identical to those in the previous Figures are labeled with the same reference characters as therein, and are usually not described again.

Circuit 200 serves to operate a motor 202 whose three strands (phases) 204, 206, 208 are depicted in a delta configuration. Mutatis mutandis, a star-configured circuit is of course also possible.

Circuit 200 has at the bottom three n-channel MOSFETs 210, 212, 214 whose respective sources S are each connected to node 89.

Circuit 200 has at the top three p-channel MOSFETs 218, 220, 222 for which each source S is connected to positive pole 30 of DC link circuit 30, 32.

Drains D of FETs 210, 218 are connected to a node 226. Drains D of FETs 212, 220 are connected Lo a node 228. Drains D of FETs 214, 222 are connected to a node 230.

Strand 204 is connected between nodes 226 and 228.
Strand 206 is connected between nodes 228 and 230.
Strand 208 is connected between nodes 226 and 230.

Motor 202 has a permanent-magnet rotor 232 that is depicted here only very schematically as a four-pole rotor and that, depending on the design, can have a different form and different numbers of poles, e.g. an internal rotor, external rotor, flat rotor, etc. It controls a Hall sensor 234 whose output signal Hall is delivered, as shown in FIG. 2, to input RA2 of μC 80. The latter supplies not only the four output signals O1, U1, O2, U2 but also two further output signals O3 (150''') and U3 (136'''), for example at its outputs RA3, RA4; this depends on the programming of the μC.

Control of the lower FETs 210, 212, 214 is provided by three identical modules 190', 190'', 190''', which are identical to modules 190, 190' of FIG. 3 and will therefore not be described again. Through them, PWM signals 136', 136'', 136''' are delivered to the lower FETs 210, 212, 214.

The upper left FET 218 is controlled via a module 194 that is identical to module 194 of FIGS. 3 and 4 and will therefore not be described again. It contains storage capacitor 170 which also, through a lead 240 (U_brake), powers modules 196' and 196'', which are identical to module 196 of FIG. 3 and will therefore not be described again. Upper FET 220 is controlled via module 196', and FET 222 via module 196''.

Manner of Operation of FIG. 5

In the event of a voltage outage, μC 80 becomes very quickly currentless and does not supply either PWM pulses 136', 136'', 136''' or commutation pulses 150', 150'', 150''', so that the six FETs 210, 212, 214, 218, 220, 222, receive no further signals from μC 80 and therefore block.

Capacitor 170 is charged at the moment of the power outage; it charges capacitors 166, 166', 166'' through resistors 176, 176', 176'' so that lower FETs 210, 212, 214 become nonconductive but the upper FETs 218, 220, 222 automatically become conductive and cause a short-circuit of the three winding strands 204, 206, 208, so that motor 202 is automatically greatly decelerated by short-circuit braking and quickly comes to a stop.

It is particularly advantageous that the combination of storage and the three capacitors 166, 166', 166'' is also used to control commutation. This enables smooth commutation control, since the switching-on and switching-off operations can be modified depending on requirements.

The lower FETs 210, 212, 214 are preferably of the IRLR3410 type, i.e. can be controlled with low potentials, and the upper FETs 218, 220, 222 are preferably of the IRFR5410 type.

Numerous variants and modifications are of course possible within the scope of the present invention.

What is claimed is:

1. An electric motor for connection to a direct-current source (44), which motor (102) comprises:
a DC link circuit (30, 32);
a permanent-magnet rotor (104; 232);
a driver circuit having a full bridge (114; 200), in which semiconductor switches of one predetermined type are arranged in one bridge half that is connected to the one pole of the DC link circuit (30, 32), and
semiconductors of another predetermined type are arranged in the other bridge half that is connected to the other pole of the link circuit;
a stator having a stator winding arrangement (106; 204, 206, 208), the current flow through said arrangement being controllable by the full bridge (114; 200);
a program-controlled calculation arrangement (80) for controlling the full bridge (114; 200), which calculation arrangement (80) is configured to supply the semiconductor switches (120, 124; 210, 212, 214) of a first bridge half with a PWM signal (136, 136', 136'', 136'''), and to supply the semiconductor switches (118, 122; 218, 220, 222) of the other bridge half with a commutation signal (O1, O2; 150, 150', 150'', 150''') for the commutation of said semiconductor switches;
a power supply device (52) for supplying power to the program-controlled calculation arrangement (80), which power supply device is separated by a diode arrangement (42, 55) from the power supply system of the motor (102; 202) so that, in the event of a power outage, the program-controlled calculation arrangement (80) is deactivatable independently of the motor (102; 202) and then no longer supplies signals for the semiconductor switches of the full bridge; and
at least one energy storage device (170) that is associated with at least one semiconductor switch (118, 122; 218, 220, 222) of the other bridge half and, during operation of the motor (102; 202), is chargeable from the DC link circuit (30, 32), a charge stored in the storage device serving, upon cessation of the signals from the program-controlled calculation arrangement (80), to make the at least one associated semiconductor switch (118, 122; 218, 220, 222) of the other bridge half conductive, and thereby to short-circuit the stator winding arrangement (106; 204, 206, 208) through said at least one semiconductor switch (118, 122; 218, 220, 222) so that the permanent-magnet rotor (104; 232) is automatically decelerated after cessation of the signals from the program-controlled calculation arrangement (80).

2. The electric motor according to claim 1, wherein the full bridge is implemented as an H bridge (114).

3. The electric motor according to claim 1, wherein the full bridge is implemented as a three-phase full bridge (200).

4. The electric motor according to claim 1, wherein a first capacitor (170), which is chargeable via a charging circuit (174) from the DC link circuit (30, 32), is provided as an energy storage device.

5. The electric motor according to claim 4, wherein each of at least two semiconductor switches (118, 122; 218, 220, 222) of the other bridge half has, associated with it, an auxiliary capacitor (166, 166', 166'', 166''') that is connected via a charging circuit (176, 176') to the first capacitor (170) and, in a charged state, makes the associated semiconductor switch (118, 122; 218, 220, 222) conductive.

6. The electric motor according to claim 5, wherein each of the auxiliary capacitors (166, 166') has, associated with it, a voltage-limiting element (168, 168') that limits a charge voltage (u_C) of the associated auxiliary capacitor (166, 166') to a predetermined value.

7. The electric motor according to claim 5, wherein the auxiliary capacitor (166, 166') has, associated with it, a controllable semiconductor switch (164) that, in the conductive state, produces a discharge of the auxiliary capacitor (166) and thereby brings the associated semiconductor switch (118, 122) into a nonconductive state.

8. The electric motor according to claim 1, wherein the sum of the capacitance values (57, 60, 70, 98) that are associated with the power supply device (52) for the program-controlled calculation arrangement (80) does not exceed a value of 0.5 μF, in order to produce a quick shutoff of the program-controlled calculation arrangement (80) in the event of a power outage.

9. The electric motor according to claim 1, wherein the semiconductor switches (120, 124; 210, 212, 214) of one bridge half are implemented as field effect transistors that are directly controllable with a PWM signal (136, 136') from the program-controlled calculation arrangement (80).

* * * * *